United States Patent
Michaud et al.

(10) Patent No.: US 11,300,307 B2
(45) Date of Patent: Apr. 12, 2022

(54) DAMPER CONTROL ASSEMBLY AND METHOD FOR USE IN AIR FLOW SYSTEM

(71) Applicant: BROAN-NUTONE LLC, Hartford, WI (US)

(72) Inventors: Stephane Michaud, Drummondville (CA); Frederic Bazin, Drummondville (CA); Simon Blanchard, Drummondville (CA)

(73) Assignee: Broan-NuTone LLC, Hartford, WI (US)

( * ) Notice: Subject to any disclaimer, the term of this patent is extended or adjusted under 35 U.S.C. 154(b) by 509 days.

(21) Appl. No.: 16/242,498

(22) Filed: Jan. 8, 2019

(65) Prior Publication Data

US 2019/0212023 A1   Jul. 11, 2019

Related U.S. Application Data

(60) Provisional application No. 62/614,840, filed on Jan. 8, 2018, provisional application No. 62/614,848, filed on Jan. 8, 2018.

(51) Int. Cl.
*F24F 11/30* (2018.01)
*F24F 11/00* (2018.01)
(Continued)

(52) U.S. Cl.
CPC .......... *F24F 11/0001* (2013.01); *F24F 11/30* (2018.01); *F24F 11/54* (2018.01);
(Continued)

(58) Field of Classification Search
CPC .... F24F 11/0001; F24F 2110/12; F24F 13/14; F24F 11/30; F24F 2110/10
See application file for complete search history.

(56) References Cited

U.S. PATENT DOCUMENTS 6,198,243 B1 *  3/2001  Ritmanich ........... F24F 13/1426
                                              318/466
6,752,713 B2 *  6/2004  Johnson, Jr. ............ F24F 7/065
                                              454/185
(Continued)

FOREIGN PATENT DOCUMENTS

EP    0208027 A1 *  1/1987  ............... B60Q 1/05
FR    2935467       3/2010
JP    2004011926    1/2004

OTHER PUBLICATIONS

International Search Report and Written Opinion issued in PCT/US2019/012794, 56 pages, dated Mar. 26, 2019.
(Continued)

*Primary Examiner* — Edelmira Bosques
*Assistant Examiner* — Phillip Decker
(74) *Attorney, Agent, or Firm* — Barnes & Thornburg LLP

(57) ABSTRACT

A damper control assembly includes a damper body movable between a first threshold position and a second threshold position. A motor is operably connected to the damper body, wherein the motor drives the damper between the first threshold position to determine an open position and the second threshold position to determine a closed position. A controller is operably connected to the motor and has a stall detection module that detects a first rotor-lock condition when the motor drives the damper body to the first threshold position and a second rotor-lock condition when the motor drives the damper body to the second threshold position. The controller includes a memory module for storing the first and second threshold positions for use by the controller. The damper control assembly is calibrated to drive the damper body within an operating range having the open and closed
(Continued)

positions and that is less extensive than a mechanical range defined by the first and second threshold positions.

26 Claims, 15 Drawing Sheets

(51) Int. Cl.
| | |
|---|---|
| *F24F 13/14* | (2006.01) |
| *G05B 19/042* | (2006.01) |
| *F24F 11/64* | (2018.01) |
| *F24F 11/65* | (2018.01) |
| *F24F 11/54* | (2018.01) |
| *F24F 11/58* | (2018.01) |
| *F24F 110/10* | (2018.01) |
| *F24F 140/40* | (2018.01) |
| *F24F 110/20* | (2018.01) |
| *F24F 110/22* | (2018.01) |
| *F24F 130/10* | (2018.01) |
| *F24F 110/12* | (2018.01) |
| *F24F 140/30* | (2018.01) |

(52) U.S. Cl.
CPC .............. *F24F 11/58* (2018.01); *F24F 11/64* (2018.01); *F24F 11/65* (2018.01); *F24F 13/14* (2013.01); *F24F 13/1426* (2013.01); *G05B 19/042* (2013.01); *G05B 19/0426* (2013.01); *F24F 2011/0002* (2013.01); *F24F 2013/1433* (2013.01); *F24F 2110/10* (2018.01); *F24F 2110/12* (2018.01); *F24F 2110/20* (2018.01); *F24F 2110/22* (2018.01); *F24F 2130/10* (2018.01); *F24F 2140/30* (2018.01); *F24F 2140/40* (2018.01); *G05B 2219/2614* (2013.01)

(56) References Cited

U.S. PATENT DOCUMENTS

| | | | |
|---|---|---|---|
| 7,917,310 B2* | 3/2011 | Pearce | .................... F02D 41/20 |
| | | | 702/38 |
| 8,374,725 B1 | 2/2013 | Ols | |
| 9,312,801 B2* | 4/2016 | Randall | .................... H02P 7/298 |
| 9,641,122 B2* | 5/2017 | Romanowich | .......... H02P 6/085 |
| 10,309,663 B1 | 6/2019 | Taber et al. | |
| 10,580,094 B1 | 3/2020 | Haynold | |
| 10,830,464 B1 | 11/2020 | Stevenson | |
| 2005/0234596 A1 | 10/2005 | Rietschel | |
| 2010/0211224 A1 | 8/2010 | Keeling et al. | |
| 2010/0263830 A1 | 10/2010 | Noteboom et al. | |
| 2012/0232969 A1 | 9/2012 | Fadell et al. | |
| 2014/0222241 A1 | 8/2014 | Ols | |
| 2014/0277759 A1 | 9/2014 | Sipe et al. | |
| 2015/0090803 A1 | 4/2015 | Okamoto et al. | |
| 2017/0130983 A1 | 5/2017 | Vermette et al. | |
| 2017/0361259 A1 | 12/2017 | Fox et al. | |
| 2018/0023826 A1 | 1/2018 | Tucker et al. | |
| 2019/0202380 A1 | 7/2019 | Schumacher et al. | |

OTHER PUBLICATIONS

Final Office Action issued to U.S. Appl. No. 16/243,056, dated Jun. 4, 2021 (29 pages).

* cited by examiner

FIG. 6A
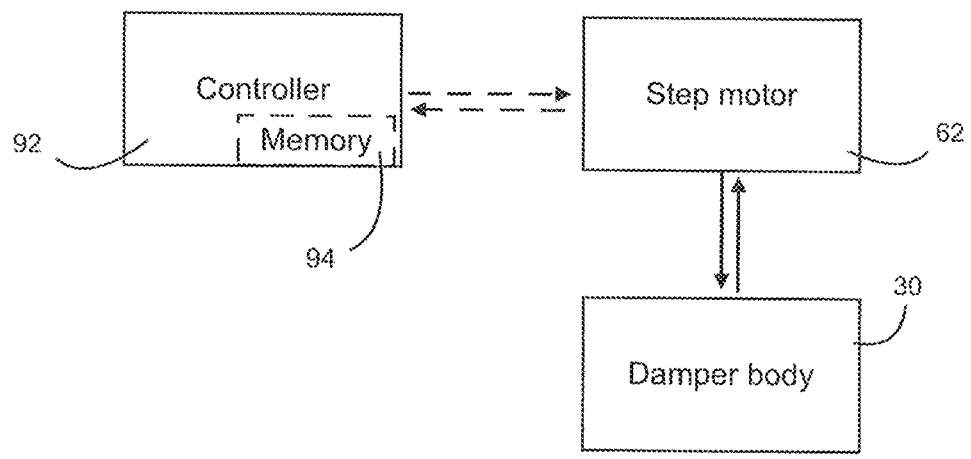
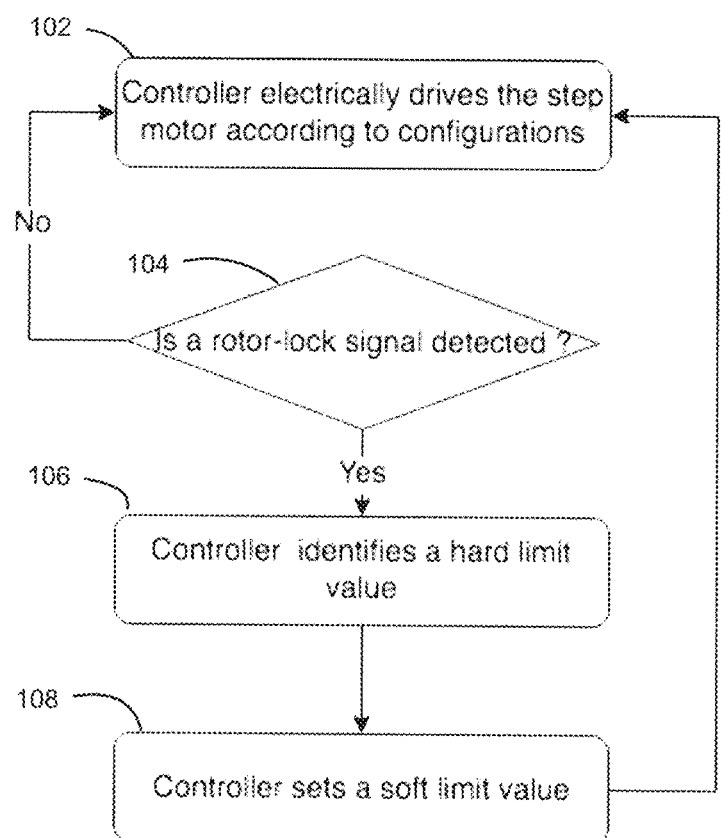
FIG. 6B

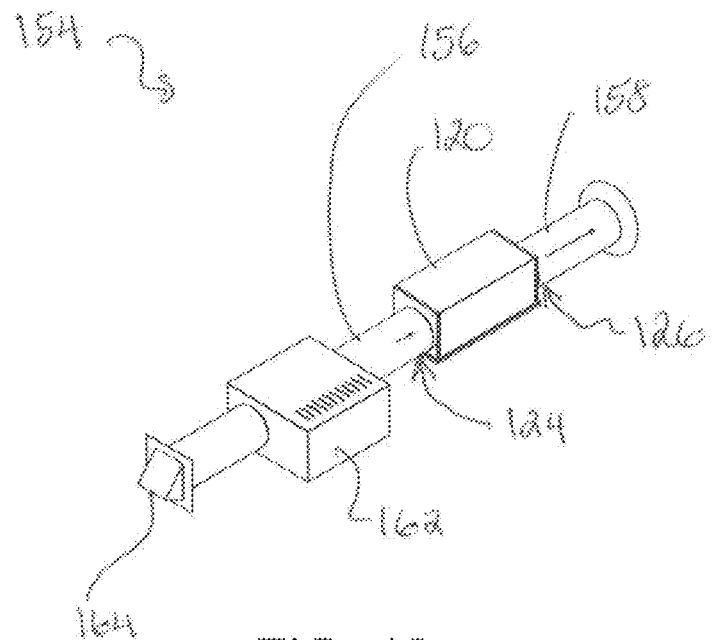
FIG. 12
FIG. 13
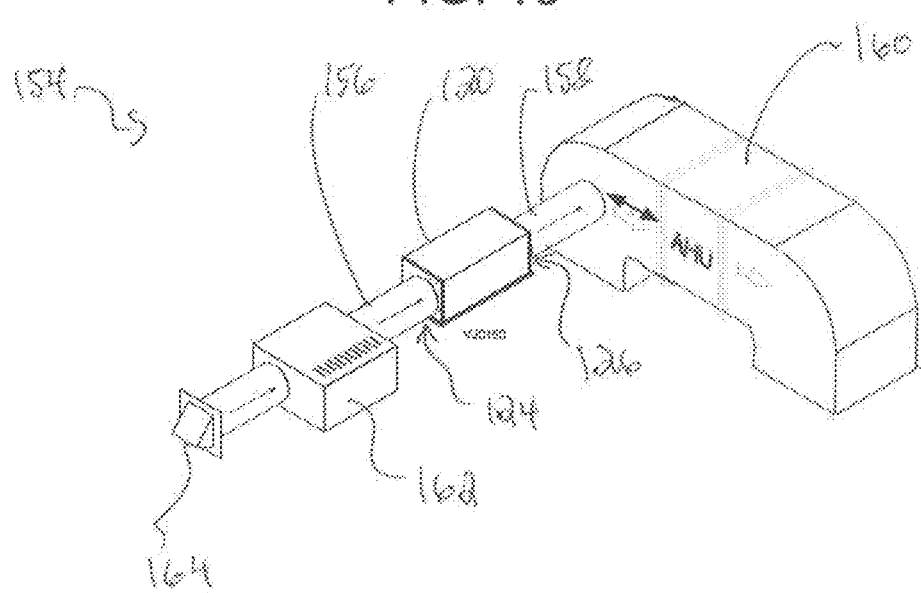

DAMPER CONTROL ASSEMBLY AND METHOD FOR USE IN AIR FLOW SYSTEM

CROSS REFERENCE TO RELATED APPLICATIONS

The present application claims the benefit of U.S. provisional patent application No. 62/614,848, filed on Jan. 8, 2018; and U.S. provisional patent application No. 62/614,840, filed on Jan. 8, 2018, the entire disclosure thereof being hereby incorporated by reference herein.

TECHNICAL FIELD

The present disclosure relates generally to devices for controlling the flow of air in heating, heat recovery, air-conditioning, and ventilation systems, hereinafter airflow systems. More particularly, the present disclosure relates to a damper control assembly having an adjustably mounted damper vane and a controller for operating, positioning, and repositioning the damper vane to regulate, limit, inhibit, and allow flow of air in an airflow system.

BACKGROUND

The use of airflow for transferring heat, moisture, scents, etc. in an airflow system is known in the art. One mechanism for directing, controlling, and regulating the quantity of air flowing through or being delivered through ducts and vents in an airflow system is a damper assembly.

Such damper assemblies for regulating, limiting, and inhibiting the airflow in such airflow systems include an adjustably mounted damper vane, which may be adjusted manually and/or by a suitable motor coupled mechanically, hydraulically, electrically, and/or by a combination of such coupling means, to the damper vane. However, conventional damper assemblies suffer from a number of shortcomings.

For example, in mechanical/electrical controllers, the electrical switches may wear and erode due to electrical arcing. This may cause failure during the normal course of operation for damper assemblies. Other problems, such as premature wear and eventual failure, may arise from the mechanical interaction between the various components of damper assemblies. These problems may result from the operational nature of particular components such as contact sensors that detect when and whether a damper vane reaches either a fully-opened position or a fully-closed position. Additionally, damper motors wear and their usable lifespans are decreased when such motors repeatedly drive a damper vane against a physical barrier that is intended to limit or prevent movement of the damper.

Therefore, a need exists for a damper assembly, which avoids wear and tear on the components thereof and further provides for more precise adjustment of the position of the damper in an open position, a closed position, and in other positions therebetween. The present disclosure describes a damper control assembly and method for controlling the assembly that improves the durability and operating life of the assembly.

The description provided in the background section should not be assumed to be prior art merely because it is mentioned in or associated with the background section. The background section may include information that describes one or more aspects of the subject technology.

SUMMARY

According to an aspect of the present disclosure, A damper control assembly includes a damper body movable between a first threshold position and a second threshold position. A motor operably is connected to the damper body, wherein the motor drives the damper between the first threshold position to determine an open position and the second threshold position to determine a closed position. A controller having a stall detection module that detects a first rotor-lock condition when the motor drives the damper body to the first threshold position and a second rotor-lock condition when the motor drives the damper body to the second threshold position. The controller includes a memory module for storing the first and second threshold positions for use by the controller. The damper control assembly is calibrated to drive the damper body within an operating range that is less extensive than a mechanical range defined by the first and second threshold positions.

According to another aspect of the present disclosure, a supply fan assembly includes a housing defining an internal cavity and having an air inlet port and an air outlet port, a blower fan assembly disposed within the internal cavity of the housing, and a damper control assembly disposed within the housing and between the outlet port and the blower fan assembly. Still further according to this aspect the damper control assembly includes a damper body movable about an axis between a first threshold position and a second threshold position and a motor operably connected to the damper body, wherein the motor drives the damper between the first threshold position to determine an open position and the second threshold position to determine a closed position. Also included is a controller for operating the motor, the controller having a stall detection module that receives a first rotor-lock signal when the motor drives the damper body to the first threshold position and a second rotor-lock signal when the motor drives the damper body to the second threshold position, and the controller further having a memory module for storing the first and second threshold positions for use by the controller during operation of the damper control assembly.

In accordance with yet another aspect, a method of controlling an air supply fan includes the following steps: providing a supply fan with a damper, a motor and a controller with a processor and a memory module, arranging the motor to move the damper about an axis of rotation, and controlling operation of the motor and the damper with the controller. Additionally, the method includes driving the damper to an open position that both permits airflow past the damper and leaves a first nominal gap between the damper and a first threshold, driving the damper to a closed position that occludes airflow and leaves a second nominal gap between the damper and a second threshold, and storing the open and closed positions in the memory module for use by the controller in operation of the motor and damper.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings:

FIG. 6A is a functional schematic of the components of the damper control assembly of FIG. 1;

FIG. 6B is a flow chart illustrating the process of driving a damper body according to an example embodiment;

FIG. 12 is an isometric view of the supply fan unit installed within a system of ducts and as part of a heating, ventilation, and air conditioning system; and FIG. 13 is an isometric view of the supply fan unit installed within a system of ducts and coupled with an air handling unit.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

Figure 1:
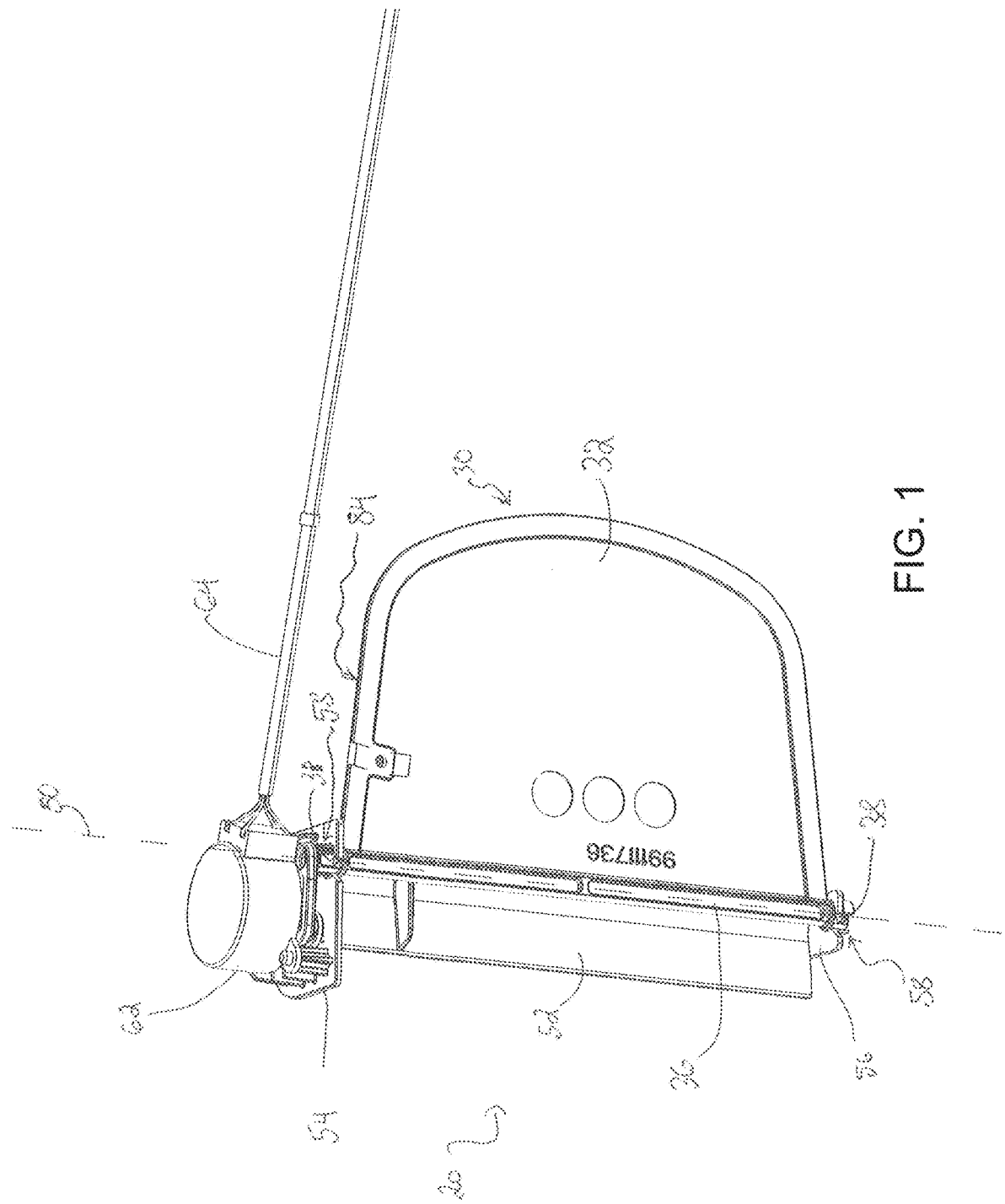
FIG. 1 is a isometric view of a damper control assembly in accordance with an exemplary embodiment.

FIGS. 1-13 show a damper control assembly 20 having an adjustably mounted damper vane 30 and a controller 92 (see FIG. 6A) for operating, positioning, and repositioning the damper vane 30 in accordance with an exemplary embodiment of the present disclosure. As discussed below, the damper control assembly 20 can be integrated into a supply fan unit 120, heat recovery ventilation (HRV) system, energy recover ventilation (ERV) system, central fan integrated supply (CFIS) system, range hood ventilator, air handling unit (AHU), exhaust fan, and/or other heating, ventilation, and cooling systems (HVAC). Referring more particularly to FIG. 1, the damper control assembly 20 comprises the damper body or vane 30 for at least substantially, and preferably entirely, obstructing an airflow passageway within a broader airflow system and/or the supply fan unit 120 (see FIGS. 9-11). In an example embodiment, the damper control assembly 20 controllably obstructs an air passageway between two segments of a duct (see FIGS. 12 and 13).

As shown in FIGS. 1-4, the damper body 30 comprises a continuous, substantially flat member 32 extending from a spine 36. The flat member 32 includes a curvilinear periphery and is the portion of the damper body 30 that extends into the passageway and functions to obstruct the passageway, as desired. At each end of the spine 36, a trunnion 38 extends beyond the flat member 32 and facilitates pivotal movement of the damper body 30 about a longitudinal axis 80 that extends through the spine 36. The damper body 30 may also be a damper vane, panel, paddle, blade, and/or any other structural member sufficient to mechanically obstruct a passage. Referring to FIG. 1, the damper body 30 pivots about a central rib or support 52 comprising a top segment 54 and a bottom segment 56. Circular opening(s) 58 are disposed at each of the top segment 54 and bottom segment 56. The trunnion(s) 38 are inserted through the respective circular opening(s) 58 at the top segment 54 and the bottom segment 56 of the central rib 52. The circular opening(s) 58 provide guidance to the corresponding trunnion(s) 38 while retaining the trunnion(s) 38, and thereby retaining the damper body 30 during operation. In example embodiments, the central rib 52 may be separable from the damper control assembly 20 and/or may be formed at least partially from ducting of the airflow system.

Figure 2:
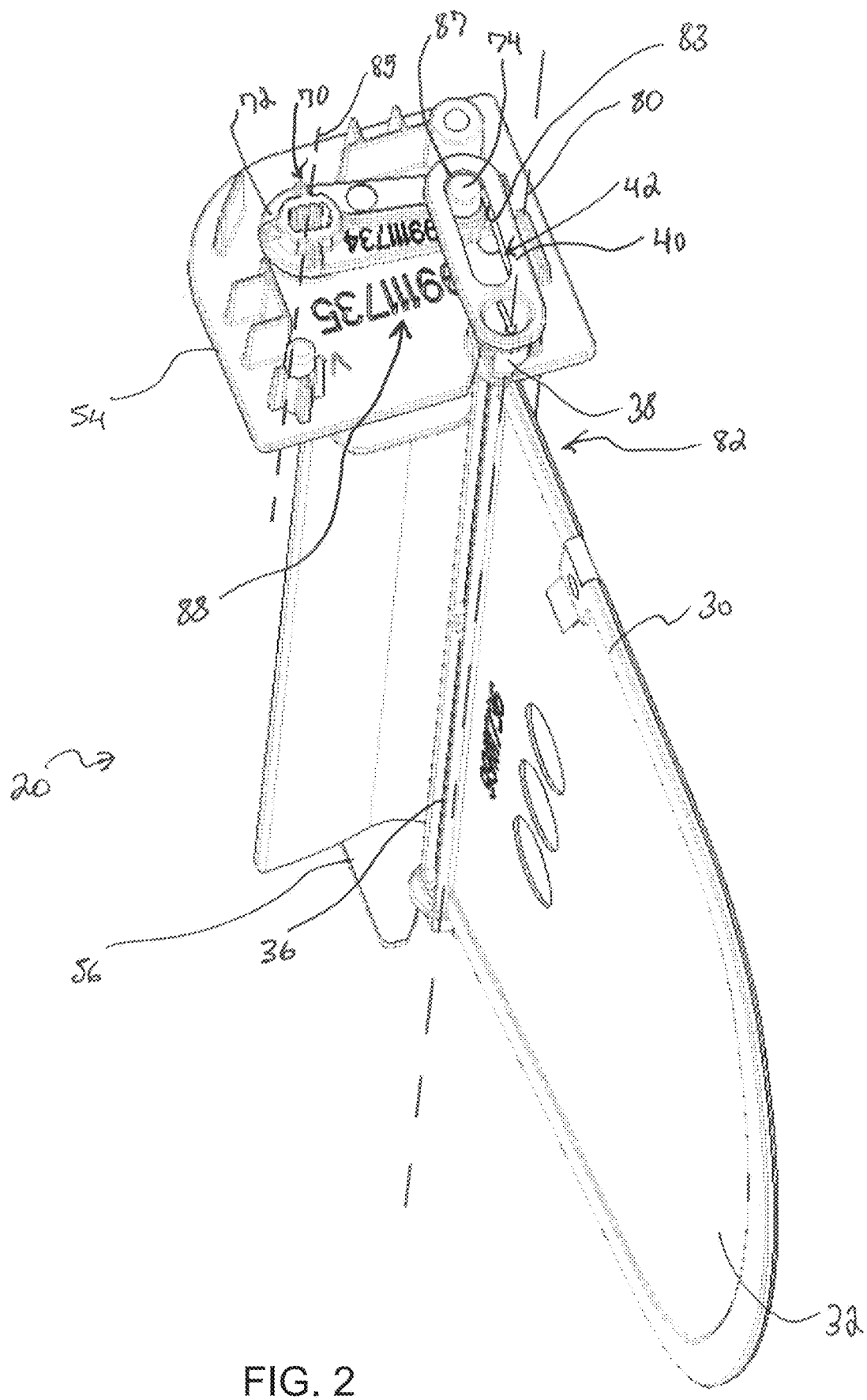
FIG. 2 is a isometric view of the damper control assembly of FIG. 1 with the motor removed in accordance with a first threshold position.
Figure 3:
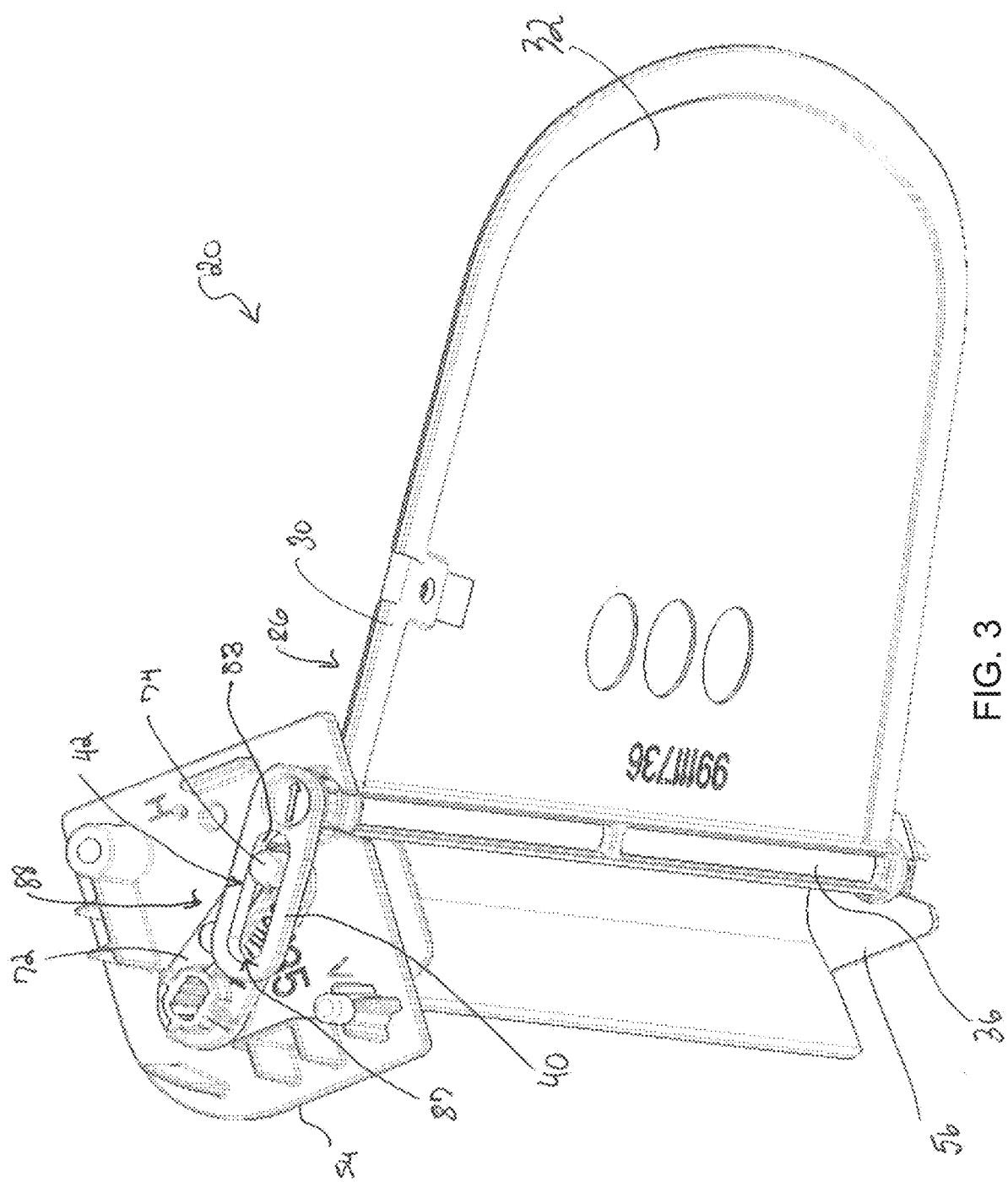
FIG. 3 is a isometric view of the damper control assembly of FIG. 1 in accordance with an intermediate position.
Figure 4:
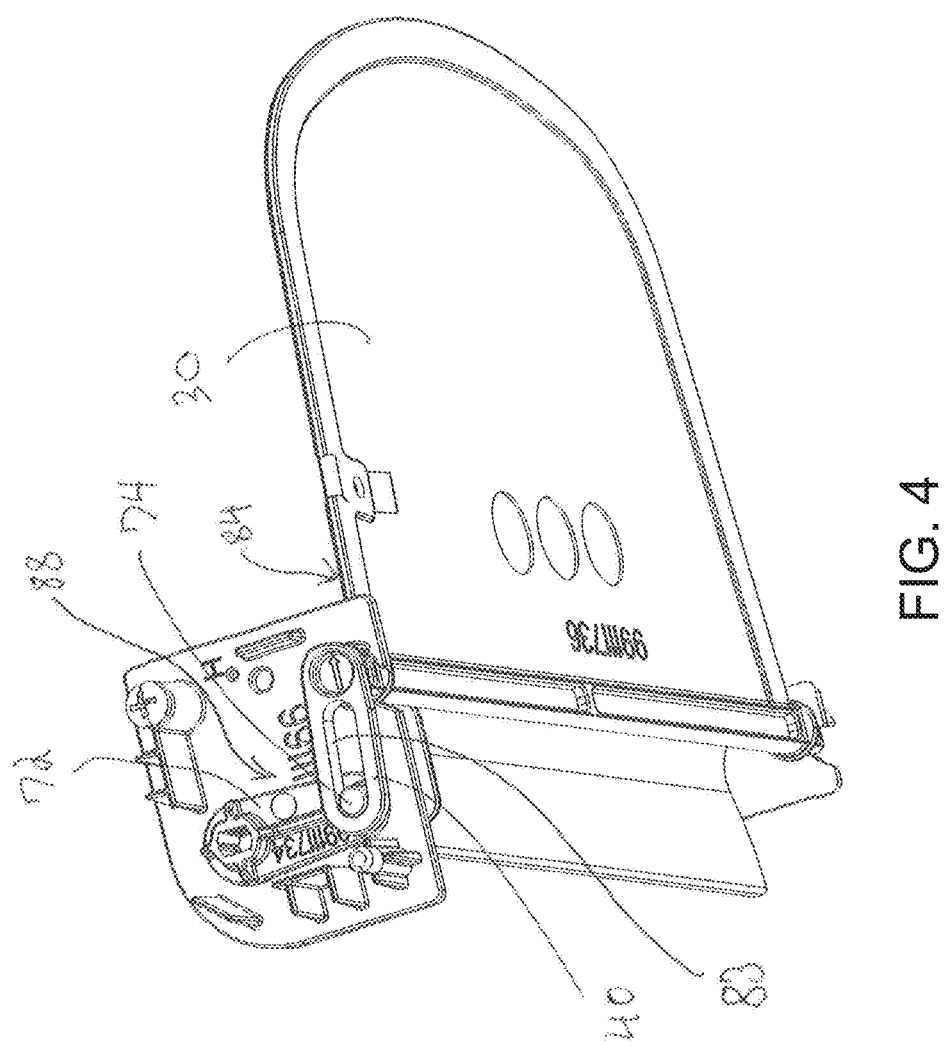
FIG. 4 is a isometric view of the damper control assembly of FIG. 1 in accordance with a second threshold position.
Figure 7:
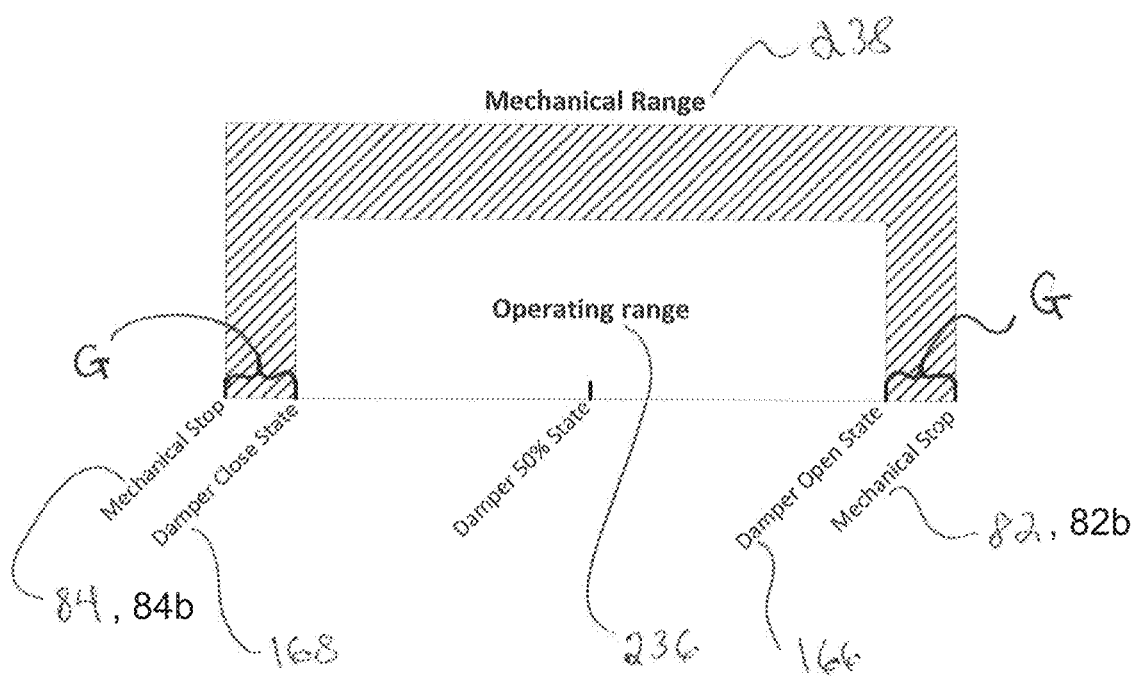
FIG. 7 is an illustration of a mechanical range traversed by the damper body during operation and/or calibration.

Referring to FIGS. 2-4, the damper body 30 pivots within an airflow passageway between a first threshold position 82 associated with an open position or damper open state 166 (see FIG. 7) and a second threshold position 84 associated with a closed position or damper closed state 168 (see FIG. 7). The first threshold position 82 provides the least obstruction to the airflow in the passageway. The first threshold position 82 corresponds to the damper body 30 being limited from opening any further, as detailed below. The second threshold position 84 provides the maximum obstruction, preferably complete obstruction, of the airflow in the passageway. The second threshold position 84 corresponds with the damper body 30 being limited from opening, possibly in both directions, as detailed below. Between the first threshold position 82 and the second threshold position 84 are one or more intermediate position(s) 86 of the damper body 30 (see FIG. 3). During movement between the first and second threshold positions 82, 84, the damper body 30 may be controllably paused or stopped in one or more of the intermediate positions 86, which may develop an adjusted airflow. The first and second threshold positions 82, 84 can arise from a linked driving mechanism 88 its ends of travel, as detailed hereinbelow. Alternatively, the first and second threshold positions 82, 84 arise from the relative position of the damper body 30 with respect to ducting and/or other components of the airflow system, as detailed hereinbelow.

A motor 62 is affixed to the central rib support 52 and operably coupled to the damper body 30 for its controlled movement between the first threshold position 82 and the second threshold position 84 (including during a calibration process discussed below) and/or between the open position 166 and the closed position 168. The motor 62 or another mechanism may retain the damper body 30 in the one or more intermediate positions 86. In example embodiments, the operative coupling between the motor 62 and the damper body 30 may be a linked driving mechanism 88 (see FIGS. 2, 3, and 4), a direct driving mechanism, or through another suitable indirect driving mechanism (e.g., cogs, strap, chain, cam, etc.). The linked driving mechanism 88 manipulates the position of the damper body 30. The motor 62 is electrically driven by a controller 92 (see FIG. 6A) through one or more electrical connections 64 (e.g., electric wiring or another suitable connection) operable for energizing the motor 62 and communicating command and error signals between the motor 62 and the controller 92.

FIGS. 2-4 illustrate the driving of the damper body 30 by the linked driving mechanism 88 between the first threshold position 82 and the second threshold position 84. The linked driving mechanism 88 comprises a driving arm 70 disposed on the top segment 54 of the central support rib 52. The driving arm 70 is also axially mounted to the motor 62 so as to be mechanically driven by the motor 62. The driving arm 70 comprises a connection plate 72 rotatable about an axis 85 and coaxial to the motor 62. The connection plate 72 comprises a cylindrical pin 74 on a distal end thereof, opposite the axis 85. The cylindrical pin 74 extends in parallel to the axis 85. A driven arm 40 is operatively coupled to the driving arm 70 by the cylindrical pin 74. The driven arm 40 may be integral with the trunnion 38, rigidly mounted to the trunnion 38, and/or otherwise coupled to the trunnion 38. In an example embodiment, the driven arm 40, trunnion 38, and the damper body 30 may be integrally formed. The driven arm 40 pivots, meaning angularly moves, about the axis 80 along with the damper body 30. The driven arm 40 comprises an oblong opening 42 through which the cylindrical pin 74 extends. The oblong opening 42 and the cylindrical pin 74 may operate together to operatively couple the driven arm 40 and the driving arm 70 and communicate forces from the driving arm 70 to the driven arm 40.

As illustrated in FIGS. 2-4, operation of the motor 62 forces the driving arm 70 to pivot clockwise or counterclockwise thereby moving the cylindrical pin 74 along an arcuate path. As a result, the cylindrical pin 74 cams along an interior surface 83 of the oblong opening 42 of the driven arm 40. The camming action of the cylindrical pin 74 within the oblong opening 42 forces the driven arm 40 to pivot about the axis 80. Likewise, the trunnion 38 affixed to the driven arm 40 pivots about the axis 80. As a result, the damper body 30 is pivoted about the axis 80 by the trunnion 38, as the damper 30 is moved between the first threshold position 82 and the second threshold position 84 and through the intermediate position 86.

FIGS. 2-4 illustrate positions of the damper body 30 as driven by the motor 62 during operation of the damper control assembly 20. Respectively, FIGS. 2, 3, and 4 depict the first threshold position 82, at least one of the one or more intermediate positions 86, and the second threshold position 84. As shown in these FIGS., the driving arm 70, the driven arm 40 and the location of the cylindrical pin 74 within the oblong opening 42 changes in accordance with the respective position depicted.

The first and second threshold positions 82, 84 arise under two different conditions: Condition (I) and Condition (II). Under Condition (I), the driving arm 70 and driven arm 40 are configured and arranged to define the threshold positions 82, 84. Under Condition (II), the damper body 30 contacts one or more constraints, such as a portion of ducting 158 (see FIGS. 12 and 13), the outlet port 126 (see FIGS. 9-13), or a structure positioned within the ducting 158 such as a stopper, a tab, and/or another suitable constraint, to define the first and second threshold positions 82, 84.

In the illustrated example embodiment and according to Condition (I), the driving arm 70 and the driven arm 40 are configured to prevent the driven arm 40 from driving the driving arm 70 beyond the first and second threshold positions 82, 84. When the cylindrical pin 74 is disposed proximal an end 87 of the oblong opening 42 distal the trunnion 38, the driven arm 40 and the driving arm 70 are disposed at or near a right angle relative one another. In this position, if a moment is applied on the damper body 30, the communicated moment would result in an interior surface 83 of the oblong opening 42 applying an inward radial force on the cylindrical pin 74 of the driving arm 70. Given the position of the driving arm 70, an inward radial force on the cylindrical pin 74 is directed towards the axis 85, rather than radially about the axis 85. Directing the inward radial force towards the axis 85 decreases the efficiency of any displacement communicated to the driving arm 70.

Upon reaching one of the first or second threshold positions 82, 84 in accordance with Condition (I) the damper body 30 may not be able to move further due to the interaction between the components of the linked driving mechanism 88. The interaction between the oblong opening 42 and the pin 74 leads to the threshold positions 82, 84 because once the cylindrical pin 74 reaches an end of the oblong opening 42, and, therefore, is unable to travel further, rotation of the motor 62 encounters resistance. The first threshold position 82, under Condition (I), can occur when the pin 74, driven in a first direction such that the damper body 30 does not obstruct an airflow passageway, arrives at the end 87 of the oblong opening 42 while slidingly engaging the interior surface 83. The second threshold position 84, under Condition (I), can occur when the pin 74, driven in a second direction such that the damper body 30 obstructs an airflow passageway, arrives at the end 87 of the oblong opening 42 while slidingly engaging the interior surface 83.

Alternatively, according to Condition (II), at the first threshold position 82 at least a portion of the damper body 30 pushes against a first physical constraint (e.g., a first portion of the ducting, tab, stopper, detent, or another suitable physical restraint) and thereby encounters resistance to additional movement beyond the first threshold position 82. Similarly, at the second threshold position 84 at least a portion of the damper body 30 pushes against a second physical constraint (e.g., a second portion of the ducting, tab, stopper, detent, or another suitable physical restraint) and thereby encounters resistance to additional movement beyond the second threshold position 84 under Condition (II).

Each of these resistances against further movement, encountered under conditions (i) and (ii), is detected by the controller 92 through the operative connections to the damper body 30. The controller 92 has an embedded stall detection mechanism/module 186 (see FIG. 8A). When a stall condition occurs, such condition impacts the phase current profile created by the absence of back EMF (Back ElectroMotive Force). The stall detection module 186 detects this pattern and raises a fault flag within the controller 92 for use in control operations.

According to an exemplary embodiment, the motor 62 is directly mounted to the trunnion 38 or an extent of the trunnion 38 using an axial mounting component thereby operatively coupling/joining the motor 62 and the trunnion 38 in an aligned fashion. According to an embodiment, the driving arm 70 and the motor 62 are mounted to an opposite end (the bottom 56) of the central support rib 52. A further example embodiment includes a spread angle between the orientation of the damper body 30 in the first threshold position 82 and the second threshold position 84 of about ninety (90) degrees, or another suitable spread angle. Example embodiments have a difference in the angular orientation of the driving arm 70 less than or about equal to the spread angle defined by the angle between the orientation of the damper body 30 in the first threshold position 82 and the orientation of the damper body 30 in the second threshold position 84.

Figure 5A:
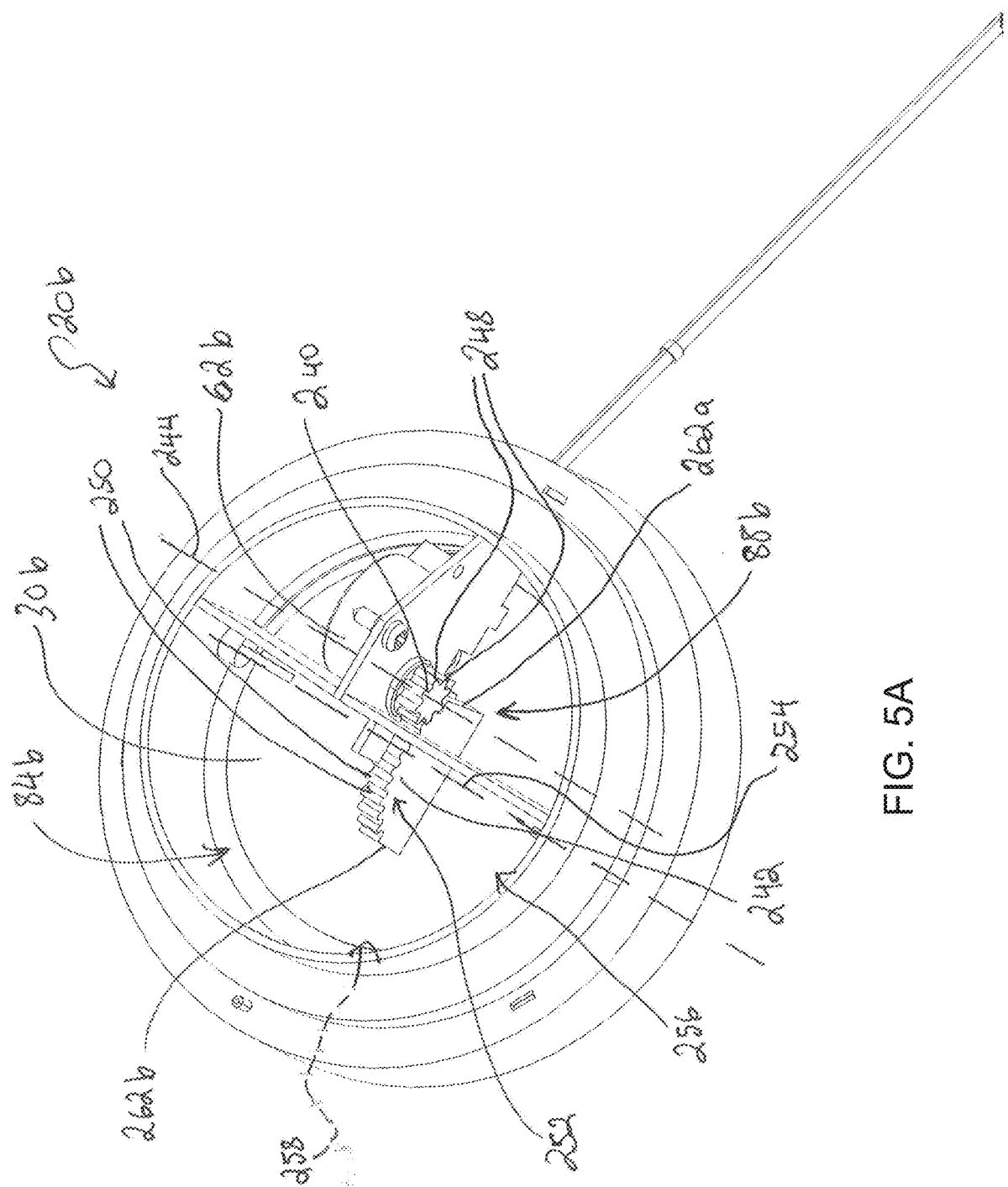
FIG. 5A is an isometric elevation view of another exemplary embodiment of a damper control assembly in accordance with a second threshold position.
Figure 5B:
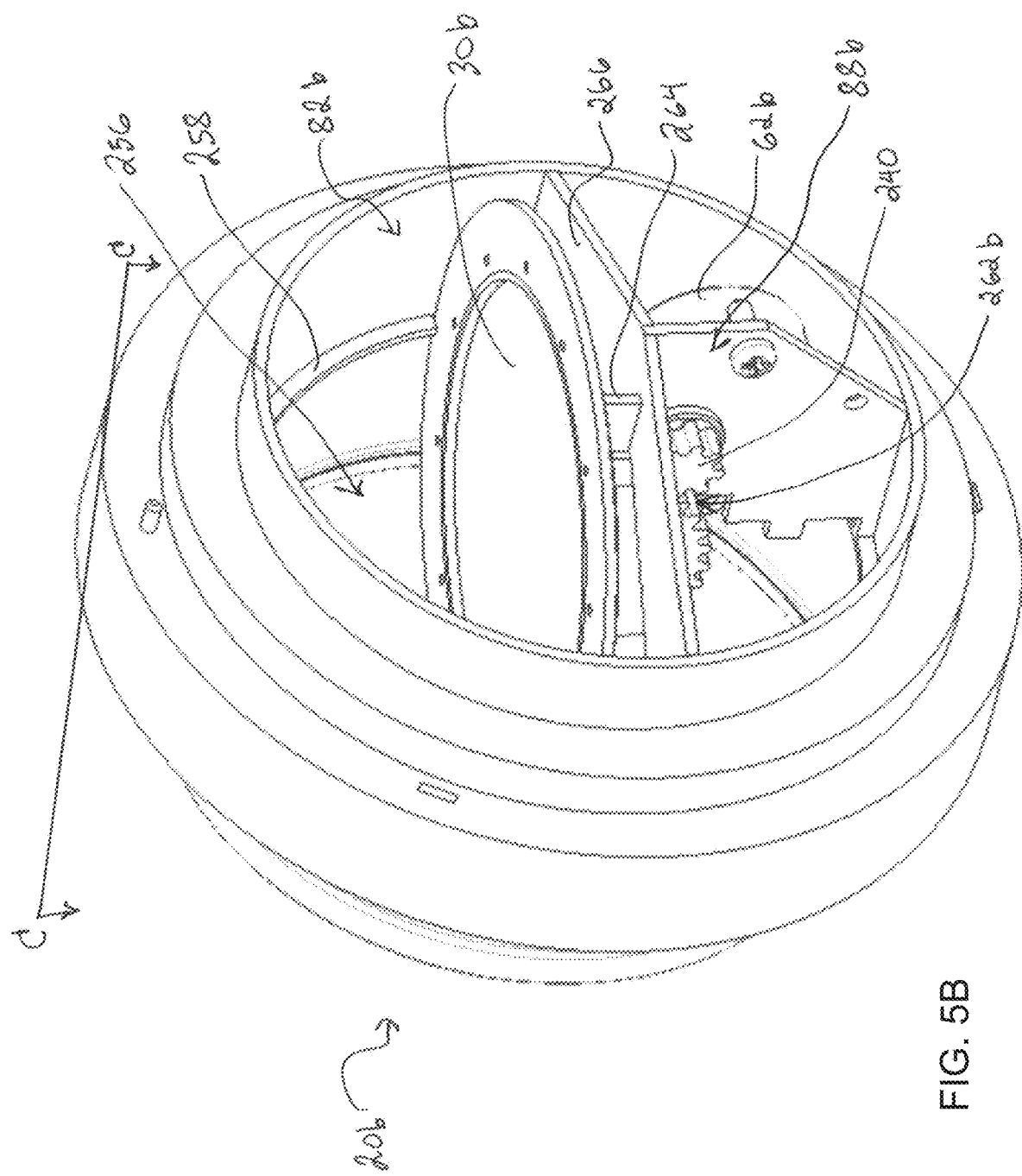
FIG. 5B is an isometric elevation view of the damper control assembly of FIG. 5A in accordance with a first threshold position.
Figure 5C:
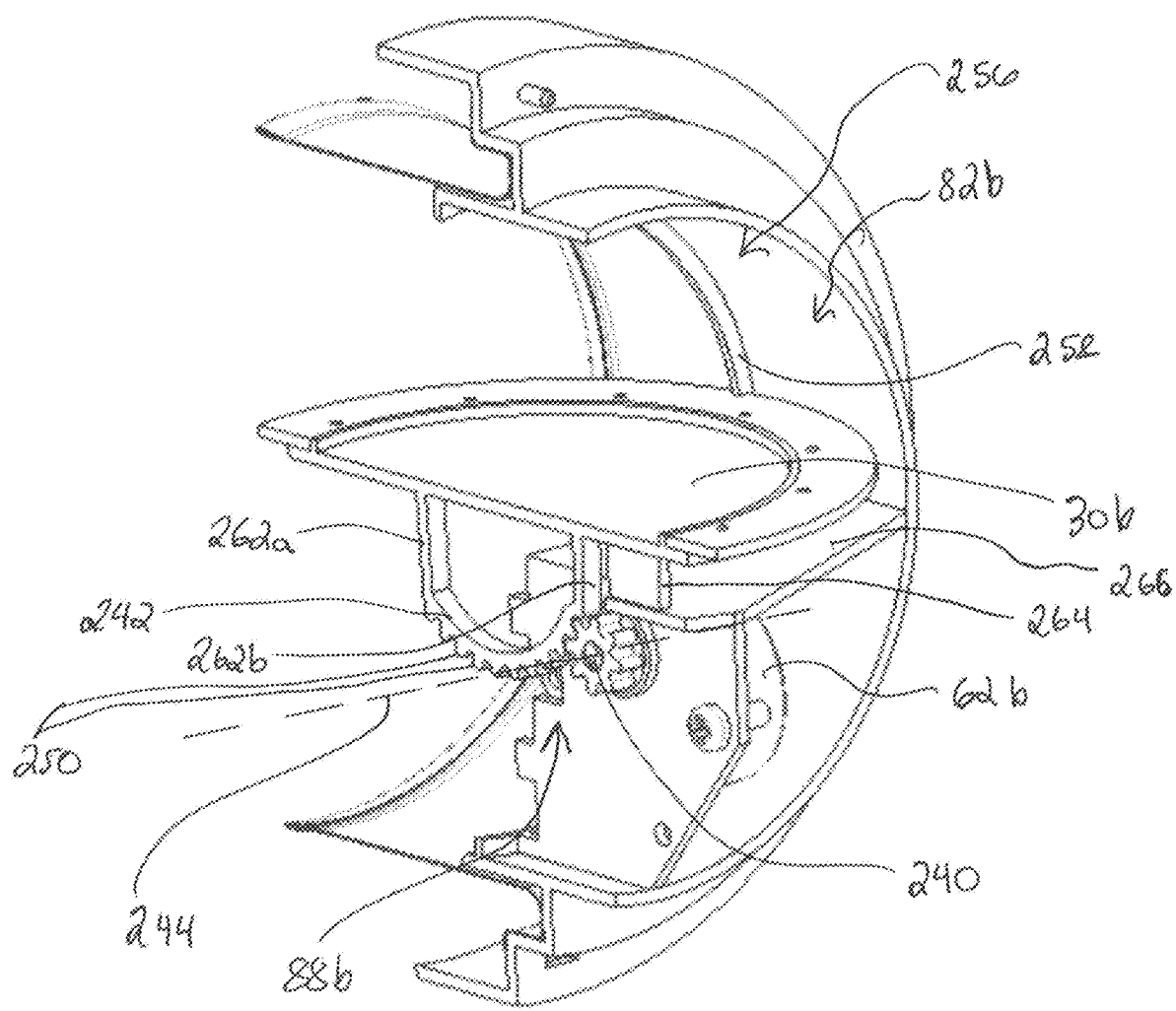
FIG. 5C is cross-sectional view of the damper control assembly of FIG. 5A taken along line C-C in FIG. 5B.

In another exemplary embodiment, FIGS. 5A-5C illustrate the driving of a damper body 30b by a geared driving mechanism 88b between a first threshold position 82b (see FIGS. 5B and 5C) and a second threshold position 84b (see FIG. 5A) within an airflow port 256. This embodiment may be suitable for installation within different ventilation systems, such as an air exchanger or an HRV or an in-line heater 162 (see FIGS. 12 and 13). The operation of this damper control assembly 20b is analogous to that of the damper control assembly 20 described hereinabove, except for the inclusion of a different driving mechanism; specifically, the geared driving mechanism 88b in the damper control assembly 20b. The geared driving mechanism 88b includes a driving gear or pinion 240 and a partial driven gear or rack 242. The pinion 240 is operably connected to a motor 62b, such as a stepper motor or another suitable motor. The motor 62b drives the pinion 240, which, in turn, rotates about motor axis 244. The pinion 240 has one or more driving teeth 248 disposed thereabout. Further, the rack 242 has one or more driven teeth 250 disposed along an extent 252 thereof.

When the pinion 240 rotates, the one or more driving teeth 248 thereof contact the one or more driven teeth 250. As a result of the one or more driving teeth 248 meshing with the one or more driven teeth 250, the rack 242 moves with respect to the pinion 240, which is relatively stationary within the damper control assembly 20b, aside from rotation thereof. The rack 242 is fixedly coupled with the damper body 30b such that movement of the rack 242 pivots the damper body 30b about a damper axis 254. Accordingly, the rack 242 is not exclusively linear, but may be a partial gear disposed radially about a point or axis, as noted hereinabove, that operates to pivot the damper body 30b.

FIG. 5A depicts the damper control assembly 20b with the damper body 30b at the second threshold position 84b. The second threshold position 84b is associated with the closed position 168 (see FIG. 7) wherein the damper body 30b is in a closed state such that the damper body 30b substantially obstructs, preferably completely obstructs, the airflow port 256. In a similar manner as is discussed hereinabove with respect to the damper control assembly 20, the closed position 168 of the damper body 30b is established with reference to the second threshold position 84b. The second threshold position 84b may result from the damper body 30b contacting a lip or flange 258 of the airflow port 256 (see FIG. 5B for the lip or flange 258). Alternatively, a tab or stopper may be disposed on a first end 262a of the rack 242 in order to contact the pinion 240 and cause the controller 92 to detect a stall condition in response to this resistance.

FIGS. 5B and 5C illustrate the damper control assembly 20b with the damper body 30b at the first threshold position 82b. The first threshold position 82b is associated with the open position 166 (see FIG. 7) wherein the damper body 30b is in an open state such that the damper body 30b is positioned to provide minimal obstruction of the airflow port 256. In a similar manner as is discussed hereinabove with respect to the damper control assembly 20, the open position 166 of the damper body 30b is established with reference to the first threshold position 82b. The first threshold position 82b may result from the damper body 30b contacting a tab or stopper 264 disposed on a mount 266 whereto the motor 62b is fixed. Alternatively, the tab or stopper may be disposed on a second end 262b of the rack 242. According to these respective configurations, the tab or stopper 264 contacts the damper body 30b or the pinion 240 and causes the controller 92 to detect a stall condition in response to this resistance.

Referring now to FIG. 6A, a schematic depicts operation of the damper control assembly 20. The controller 92 (e.g., a driver and/or driver circuitry) electrically drives the motor 62 that, in turn, provides for angular movement of the damper body 30 relative to the central support rib 52. The controller 92 transmits command signals to the motor 62 to direct operation thereof. In the event that the damper body 30 reaches one or more of the threshold positions 82, 84, the stall detection module 186 detects a stall condition in response to encountering resistance to angular movement of the damper body 30, as detailed above. The controller 92 may comprise the motor driver 176 (FIG. 8A) or operate as a driver for the motor 62.

Referring now also to FIG. 6B, the damper control assembly 20, including the controller 92, provides and controls a movement path of the damper body 30 to develop an operating range of the damper body 30. The operating range is beneficial because it decreases the number of times the motor 62 forces the damper body 30 against a limiting abutment (e.g. a sensor, ducting, linked driving mechanism, etc.) or another physical obstacle encountered along the path of the damper body 30. Decreasing the number of times the motor 62 pushes the damper body 30 and/or linked driving mechanism 88 against either a limiting abutment or physical obstacle prevents premature wearing of the motor 62 and the linked driving mechanism 88. The controller 92 comprises processing means, such as a microprocessor, CPU, custom analog circuit, digital signal processor, and/or field-programmable gate array, and memory/memory module 94, such as volatile memory, non-volatile memory, flash memory, ROM, PROM, EPROM, EEPROM, dynamic random-access memory, static random-access memory, and/or another suitable memory component. The controller 92 registers and stores in the memory 94 relative locations of the first and second threshold positions 82, 84. The controller 92 further defines a operational path of the damper body 30 which provides an operating range 236 (see FIG. 7) that maintains the body 30 a safe distance away from the threshold or mechanical stop position(s) 82, 84. In an example embodiment, the controller 92 sets the operating range 236 for the damper body 30 bounded by about 0.5 percent of a total mechanical range 238 of the damper body 30, as defined between the first and second threshold positions 82, 84. Further, when the damper body 30 is obstructed during travel along the path of the operating range 236, rotor-lock signals received within the operating range 236 result in an error signal, and potentially closure of the damper control assembly 20.

FIG. 7 depicts the relationship between the operating range 236 of the damper body 30 and the motor 62 and the mechanical range 238. The operating range 236 extends between from the damper open position or state 166 and the damper closed position or state 168. A nominal space or gap (G) is provided between the open position 166 and the first threshold 82, whereat the damper body reaches the first mechanical stop. Similarly, a nominal space or gap (G) is provided between the closed position 168 and the second threshold 84, whereat the damper body reaches the second mechanical stop. Therefore, the mechanical range 238 is larger than and encompasses the operating range 236 of the damper body 30 and the motor 62. According to an example embodiment, the nominal gap (G) may be fifty full steps of a stepper motor, or approximately 4.5 degrees where the stepper motor 62 has a gear ratio of 1/85 and each full step represents 7.5 degrees/85 or 0.0882 degrees.

The controller 92 is adapted to detect and process a first rotor-lock signal when the motor 62 encounters rotational resistance as the damper body 30 reaches the first threshold position 82. Upon detection of the first rotor-lock signal, the controller 92 associates a "first hard limit position value" to the first threshold position 82 (e.g., step value: 00.000 for example embodiments comprising a stepper motor. Next, the controller 92 directs the motor 62 to angularly displace the damper body 30 to the second threshold position 84 whereat another, second rotor-lock signal is detected by the controller 92. The controller 92 associates a "second hard limit position value" to the second threshold position 84 (e.g., step value: 50.000). Accordingly, the difference between the first and second hard limit position values is indicative of a number of steps to be performed by the motor 62 for the damper body 30 to travel from one of the threshold position(s) 82, 84 to the other threshold position 82, 84. The controller 92 further defines a "first soft threshold position value" and "a second soft threshold position value" (e.g., respective step values: 00.200 and 49.800) to stop the damper body 30, respectively, in the open position 166 and the closed position 168 without causing the motor 62 to generate rotor-lock signal(s) and/or apply forces against the limiting obstacle(s) (e.g., a sensor to abut ducting under Condition (II); the end 87 of the oblong opening 42 under Condition (II). In this example, the step value may not equal one step but may be arbitrarily assigned to a number of steps. In this way, the present system and method prevent premature wearing of the motor 62 and damper body 30. Further, in the first and second positions 82b, 84b (FIGS. 2-4) associated with the soft threshold position values, the airflow is allowed or prevented, respectively, with relative equivalency to the first and second threshold positions 82, 84 associated with the damper body 30 reaching the physical limits of the system.

Figure 8A:
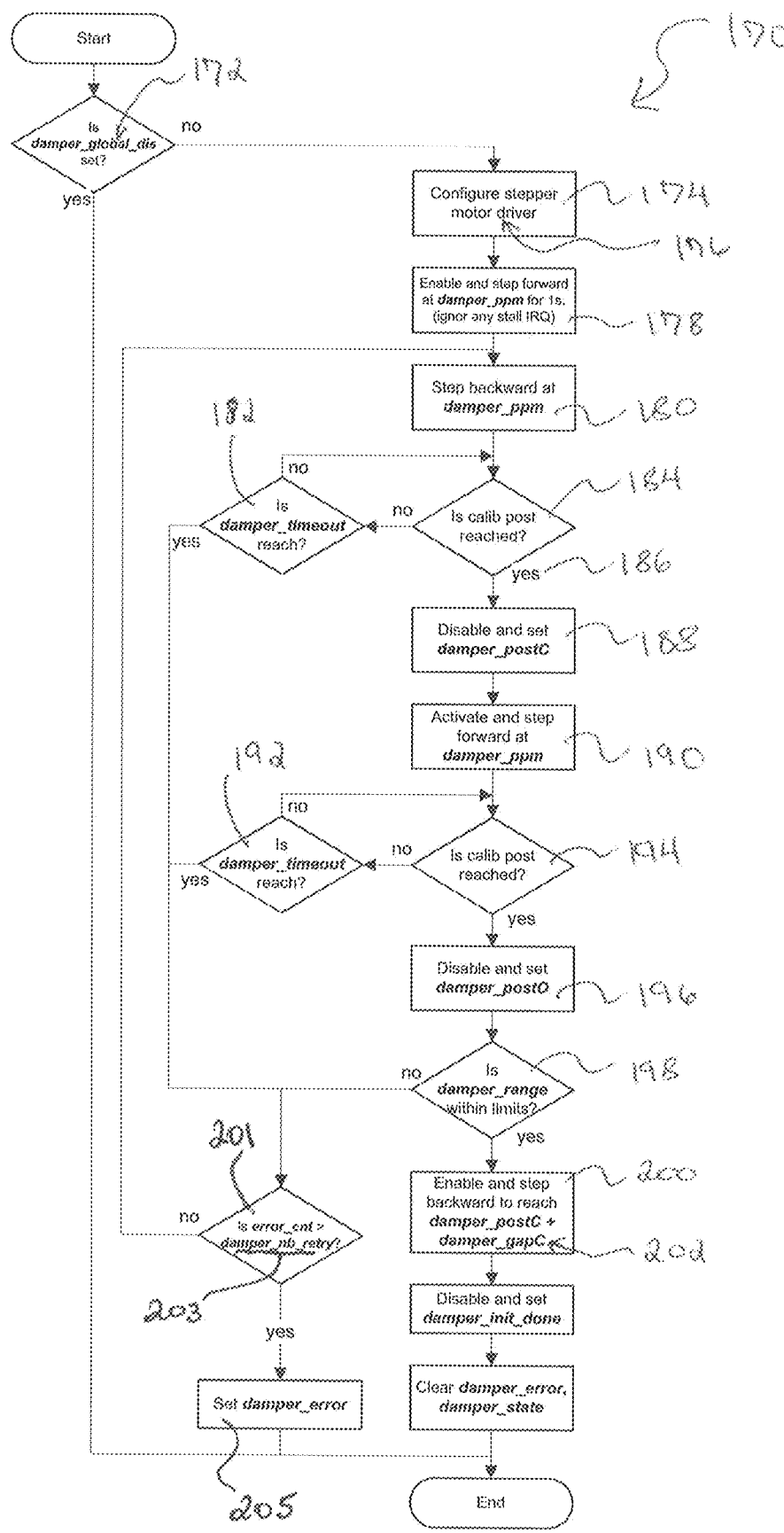
FIG. 8A is a flow chart illustrating a process of initializing and/or calibrating the damper control assembly.

Referring now to FIG. 8A, a damper initialization process 170 is shown as a flowchart. In example embodiments, the controller 92 executes the damper initialization process 170 when the damper control assembly 20 is first installed to needs to be re-initialized. When the damper initialization process 170 begins, a global damper override value 172 is checked ("damper_global_dis"). The global damper override value 172 may operate to override the initialization, calibration, opening, and/or closing of the damper body 30. So long as the global damper override value 172 is not activated, the damper initialization process 170 proceeds to a first step 174 of configuring a motor driver 176. In the example embodiment of FIG. 8, the motor 62 is a stepper motor; but, as noted hereinabove, another suitable motor may be used. Upon configuration of the motor driver 176, the motor 62 is stepped forward at a next step 178. This step 178 provides an opportunity to move the damper body 30 away from the first threshold position 82 and therefore preparing the damper body 30 to step forward later in the damper initialization process 170 because detection is generally more reliable when the motor 62 is moving.

At first driving step 180, the motor 62 is driven in a desired direction (e.g. backwards, clockwise, counter-clockwise) until the first threshold 82 is reached by the damper body 30 and/or the linked driving mechanism 88. According to the current example, the damper body contacts the first and second thresholds 82, 84; however, the same process is applied when feedback is received because the linked driving mechanism 88 reaches the first and second thresholds 82, 84 under condition ii. Until the damper body 30 contacts the first threshold 82, a timer is polled at step 182 to check for errors in registering contact with the first threshold position 82.

At step 184, the first threshold 82 is contacted by the damper body 30. A stall detection module 186 detects that the damper body 30 has reached the first threshold 82 by registering a stall condition of the motor 62. In the next step 188, a location value of the damper body 30 may be determined, for example, by a number of steps completed by the motor 62. The location of the first threshold 82, contacted by the damper body in previous step 184, is stored to the memory 94.

After the location of the first threshold 82 is stored, the motor 62 drives the damper body 30 in another direction (e.g. forward, counter-clockwise, clockwise, or opposite the first direction of step 180) at step 190. Again, at step 192, as in previous step 182, a timer is polled to check for errors in registering contact with the second threshold position 84. The timer may further assist in detecting mechanical failure of the damper control assembly 20.

The stall detection module 186 detects that the damper body 30 has reached and contacted the second threshold 84 by registering a stall condition of the motor 62, as described for step 184. In the next step 196, a location of the damper body 30 may be determined, for example, by a number of steps completed by the motor 62 from a previously known location, such as the first threshold 82. The location of the second threshold 84, contacted by the damper body in previous step 194, is stored to the memory 94.

An application-specific damper range is pre-determined before installation, and, in step 198, the first and second threshold positions 82, 84 are compared against the damper range to ensure accuracy of the damper initialization process 170. Additionally, the damper range may be defined in such a way that unwanted obstacles may be detected along a path of the damper body 30. For example, if the open position 166 and/or the closed position 168 are not each within an acceptable range therefor, then debris and/or another obstruction may be preventing the damper body 30 from travelling within the supply fan unit 120.

At step 200, the damper body 30 is stepped and/or driven by the motor 62 away from the second threshold 84 by a predefined amount 202 (damper_gapC). In an example embodiment, the predefined amount 202 may be one step of a stepper motor. Accordingly, the damper initialization process 170 is complete. Damper error flags are cleared at completion of the damper initialization process 170, and an open/closed status of the damper body 30 is set. According to the example discussed hereinabove, the damper body 30 is in the closed position 168 at the end of initialization. Similarly, the open position 166 is defined as the damper body 30 being driven to a location near, but short, of the first threshold 82. For example, the open position 166 to which the damper body 30 may be driven is fifty full steps of a stepper motor short of the first threshold 82. Additionally, a retry mechanism operates at step 201 within the damper initialization process 170 such that the number of damper time-outs occurring during the steps 182, 192 and damper range errors occurring during step 198 is compared against a pre-determined number of initialization retries 203 ("damper_nb_retry"). Once range errors and damper timeouts exceed the number of remaining retries the damper control assembly 20 enters an error state at step 205.

Figure 8B:
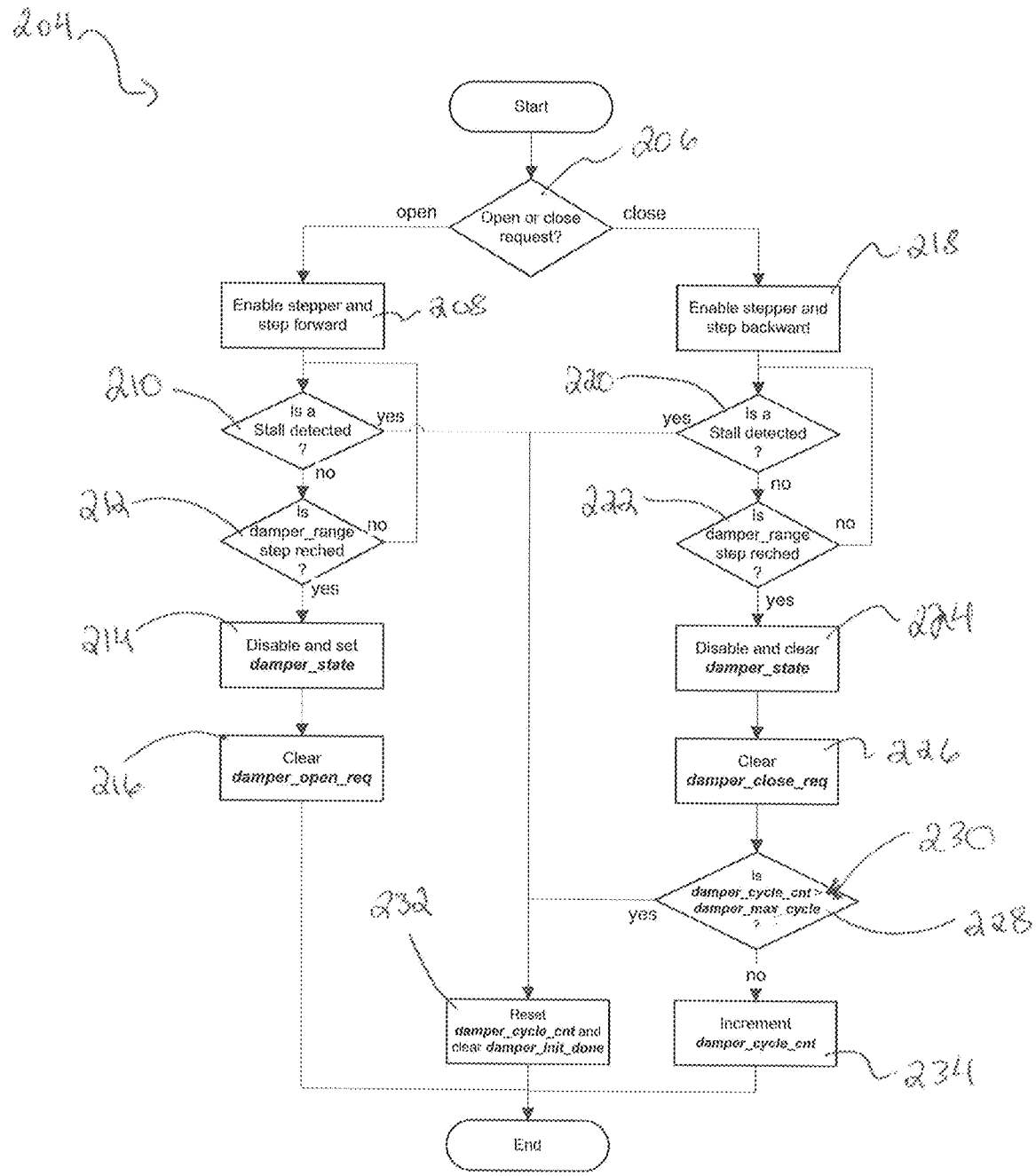
FIG. 8B is a flow chart illustrating a process of opening and closing the damper control assembly.

Referring now to FIG. 8B, a damper open/close process 204 is illustrated by flowchart. As with the damper initialization process 170, the damper open/close process 204 may be executed by the controller 92. The damper open/close process 204 begins with the controller 92 polling for an open request or a close request at step 206. The open/close request(s) may be initiated by a program executed by the controller 92, an external source such as a thermostat and/or an air handling unit ("AHU") 160 (see FIGS. 12 and 13), or by a user in communication with the controller 92.

The request step 206 determines whether an open or close request has initiated the damper open/close process 204. If an open request is received, then at step 208 the motor 62 (a stepper motor in this example) is enabled and driving of the damper body 30 begins and continues. At step 210, the controller checks for a stall detection, and at step 212, the controller 92 counts a number of steps executed by the motor 62. If a stall is detected, then a recalibration is called for by initiating the damper initialization process 170 of FIG. 8A. Under normal operation, a stall will not be detected, and the motor 62 will execute the number of steps needed for the damper body 30 to reach the open position 166.

Upon reaching the open position 166, step 214 disables the motor 62 and sets the open/closed status of the damper body 30 to "open". At step 216 (sequentially or serially with step 214), the damper open request is cleared. However, returning to the request step 206, if a close request is received, then at step 218 the motor 62 (a stepper motor in this example) is enabled and driving of the damper body 30 begins and continues. At step 220, the controller checks for a stall detection, and at step 222, the controller 92 counts a number of steps executed by the motor 62. If a stall is detected, then a recalibration is called for by initiating the damper initialization process 170 of FIG. 8A, similar to the operation of step 212. Under normal operation, a stall will not be detected, and the motor 62 will execute the number of steps needed for the damper body 30 to reach the closed position 168.

Upon reaching the closed position 168, step 224 disables the motor 62 and sets the open/closed status of the damper body 30 to "closed". At step 226 (sequentially or serially with step 224), the damper close request is cleared. Following a damper close request, an additional step 228 checks a damper cycle counter 230. Many motors, including stepper motors, encounter errors and/or inconsistencies during driving operation, e.g. skipping steps. To account for this, the damper cycle counter is included within the control sequence When the damper cycle counter 230 reaches a particular number, e.g. 1000 open/close cycles of the motor 62; then the controller 92 forces a recalibration of the damper control assembly 20 by calling the damper initialization process 170 (FIG. 8A) at step 232. However, if the damper cycle counter 230 has not reached the particular number, then the value of the damper cycle 230 is incremented and stored at step 234.

According to example embodiments, the motor 62 that causes the damper body 30 to reach the open position 166 or the closed position 168 may be controlled by operating the motor 62 for a set amount of time (instead of or in addition to counting of steps) and/or according to other motor control mechanisms.

According to an embodiment, the controller 92 may comprise a printed circuit board (PCB) having a microprocessor from Allegro MicroSystems LLC (http://www.allegromicro.com/) disposed thereon. The microprocessor is capable of decoding rotor-lock signals, storing an algorithm as described hereinabove, registering/storing sensed data, and/or generating and communicating command signals to the motor 62. According to an embodiment, the memory module 94 capable of registering values may be further integrated into/disposed on the PCB.

Referring again to FIG. 6B, a method of controlling the damper body 30 comprises a first step 102 wherein the controller 92 electrically drives the motor 62 according to the above-described aspects and functionality. These include the program, the response to command signal(s) from the operatively coupled controller, and the set limits for rotation of the damper body 30 by the motor 62. A next step 104 includes detecting whether a rotor-lock signal is present. As detailed herein, the controller 92 is adapted to generate and communicate a rotor-lock signal upon encountering resistance (greater than a certain threshold) to the rotation of the motor 62 when driven. According to a further step 106, the controller 92 identifies a hard limit position value corresponding to one of the first and second threshold positions 82, 84 whereat rotation of the damper body 30 was prevented. Another step 108 includes the controller 92 setting a soft limit position value corresponding to one of the open position 166 or the closed position 168 determined on the basis of the identified hard limit value(s) supplied as an input. Further, according to the step 108, the soft limit position value may registered in the memory 94, thereby modifying the configurations that control the driving process of the motor 62 and the pathway of the damper body 30.

Referring now to FIGS. 9-13, the supply fan unit 120 comprises a housing 122, an inlet port 124, and the outlet port 126. The supply fan unit 120 may be installed in a building, home, apartment or other structure with the inlet port 124 connected to a length of duct work or ducting that is in fluid connection with the exterior environment. In accordance with this configuration, the supply fan unit 120 is capable of drawing fresh air though the ducting, that forms an airflow passageway, into the building interior. The outlet port 126 is connected to additional ducting that can be fluidly connected with another component, such as the AHU 160 (see FIGS. 12 and 13), to controllably supply air from the supply fan unit 120. The housing 122 defines an internal cavity 123 that provides a closed environment within the supply fan unit 120 thereby preventing outside air from uncontrollably flowing into the environment within which the air supply unit 120 is installed. The internal cavity 123 within the housing 122 also prevents relatively unfresh air of the building interior (e.g., the attic of the building) from mixing with fresh, incoming air from the exterior environment.

The air supply unit 120 defines an interior airflow path from the inlet port 124 through a filter 132 and into the internal cavity 123. Further along the interior airflow path, the fresh air encounters integrated sensors such as a temperature sensor 134 and a humidity sensor 136. As discussed above, according to example embodiments, one or more other suitable integrated and/or external sensors may alternatively or additionally be present within the internal cavity 123 and along the interior airflow path. Next, the interior airflow path is propelled by a fan 142 towards the damper control assembly 20 that resides upstream of the outlet port 126. The damper control assembly 20 manipulates and adjusts the damper body 30 between open, closed, and intermediate positions. The position of the controllable damper body 30 and the controllable speed of the fan 142 precisely adjust the airflow path and rate as the airflow is discharged through the outlet port 126 and from the air supply unit 120.

Figure 9:
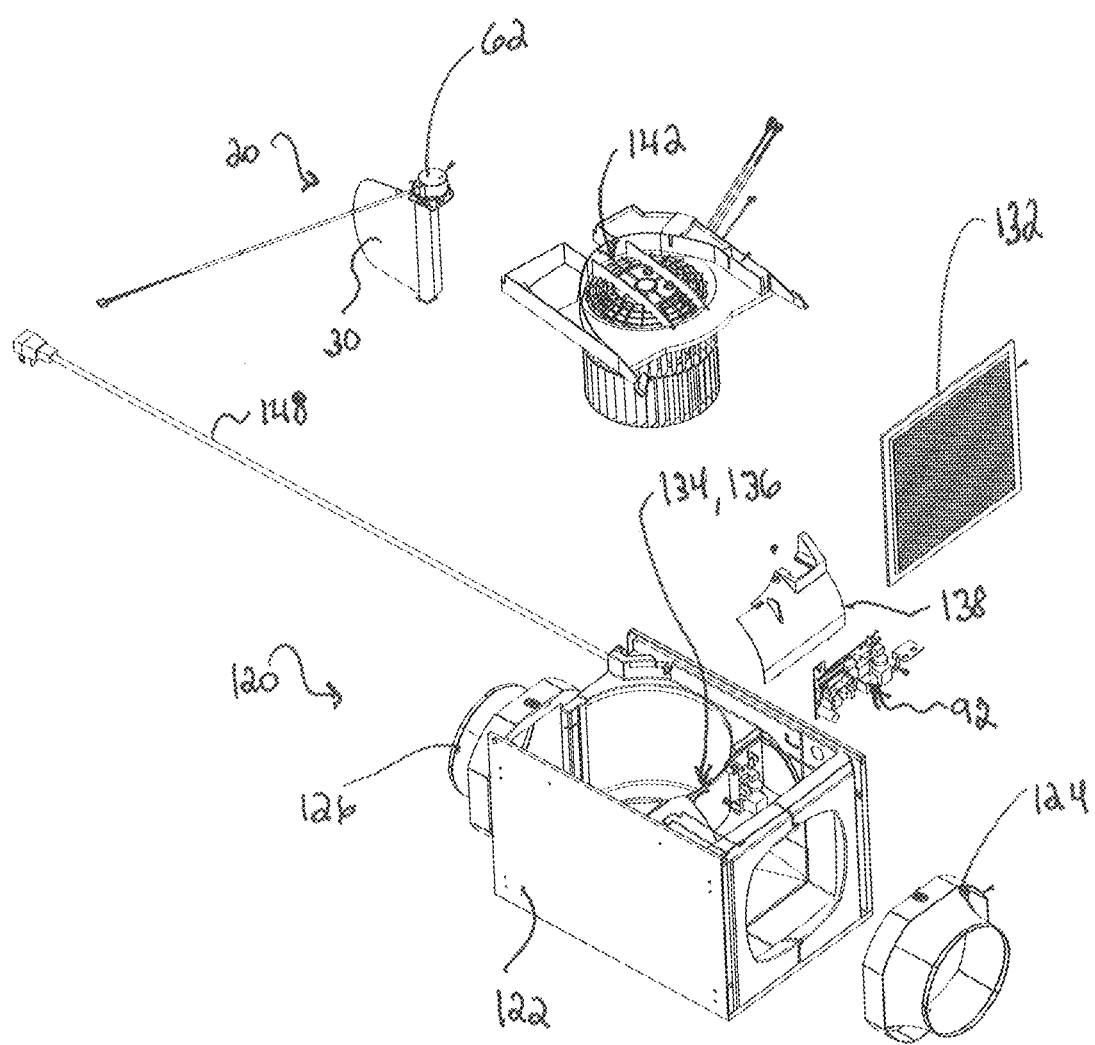
FIG. 9 is an exploded view of a supply fan unit including the damper control assembly of FIG. 1.

As mentioned above, the air supply unit 120 further comprises a controller 92 for controlling the damper body 30 and the fan 142. The integrated sensors 134, 136 are also connected to the controller 92 which resides within a enclosure cover 138. Additional electrical/electronic components, such as one or more printed circuit boards (PCBs) and/or other control circuitry are also housed within the cover 138. The cover 138 may protect the controller 92 and other electrical components from undesirable human contact and/or prevent the accumulation of humidity and rapid temperature variation from affecting the enclosed controller 92 and other enclosed electric/electronic components. Referring still to FIG. 9, the air supply unit 120 is powered and may be connected to the grid of the building via one or more power leads 148. The power transmitted by the one or more leads 148 powers the various components of the air supply unit 120, including the controller 92, the fan 142, the damper control assembly 20, the temperature sensor 134, humidity sensor 136, and/or other components therein. In an exemplary embodiment, the air supply unit 120 may have a hardwired connection to the electrical grid of the building thereby omitting use of an outlet.

The air supply unit 120 may be powered by a one or more of sources. The fan 142 may powered by the one or more power cords 148 and/or otherwise connected to the power grid of the building. The controller 92 may be powered with, for example, a 24V (volt) power source or the 110V power grid. In an example embodiment, the 24V power source may be provided by a component of the AHU 160 such as, for example, the transformer of the AHU. According to another embodiment, the air supply unit 120 comprises a transformer connected to the power grid of the building. The transformer may transform the grid power to provide desired power characteristics. Further, the controller 92 may be powered by a direct current (DC) power source.

Figure 10:
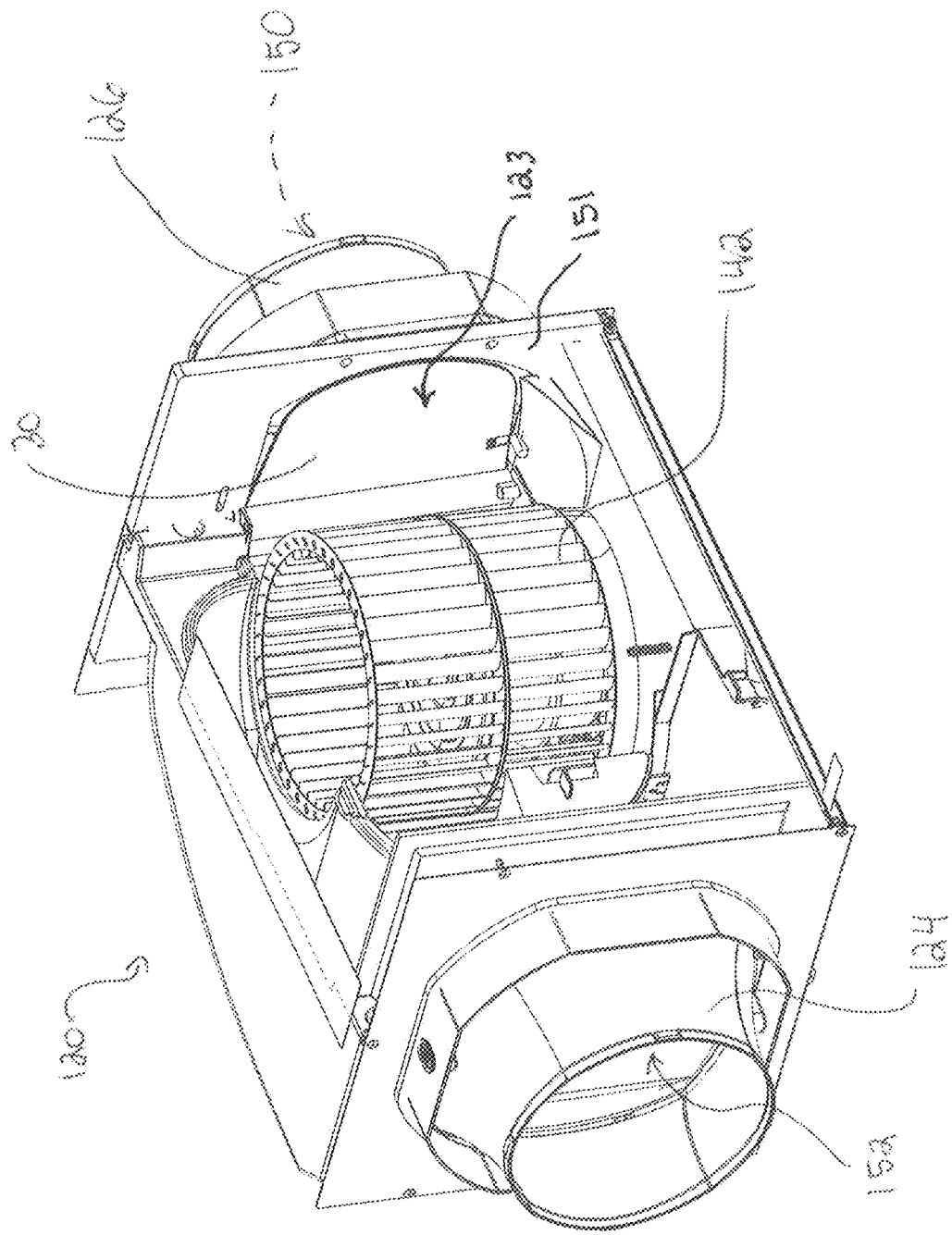
FIG. 10 is an isometric view of the damper body disposed within the supply fan as viewed through a housing of the supply fan unit with a portion thereof removed for visibility.
Figure 11:
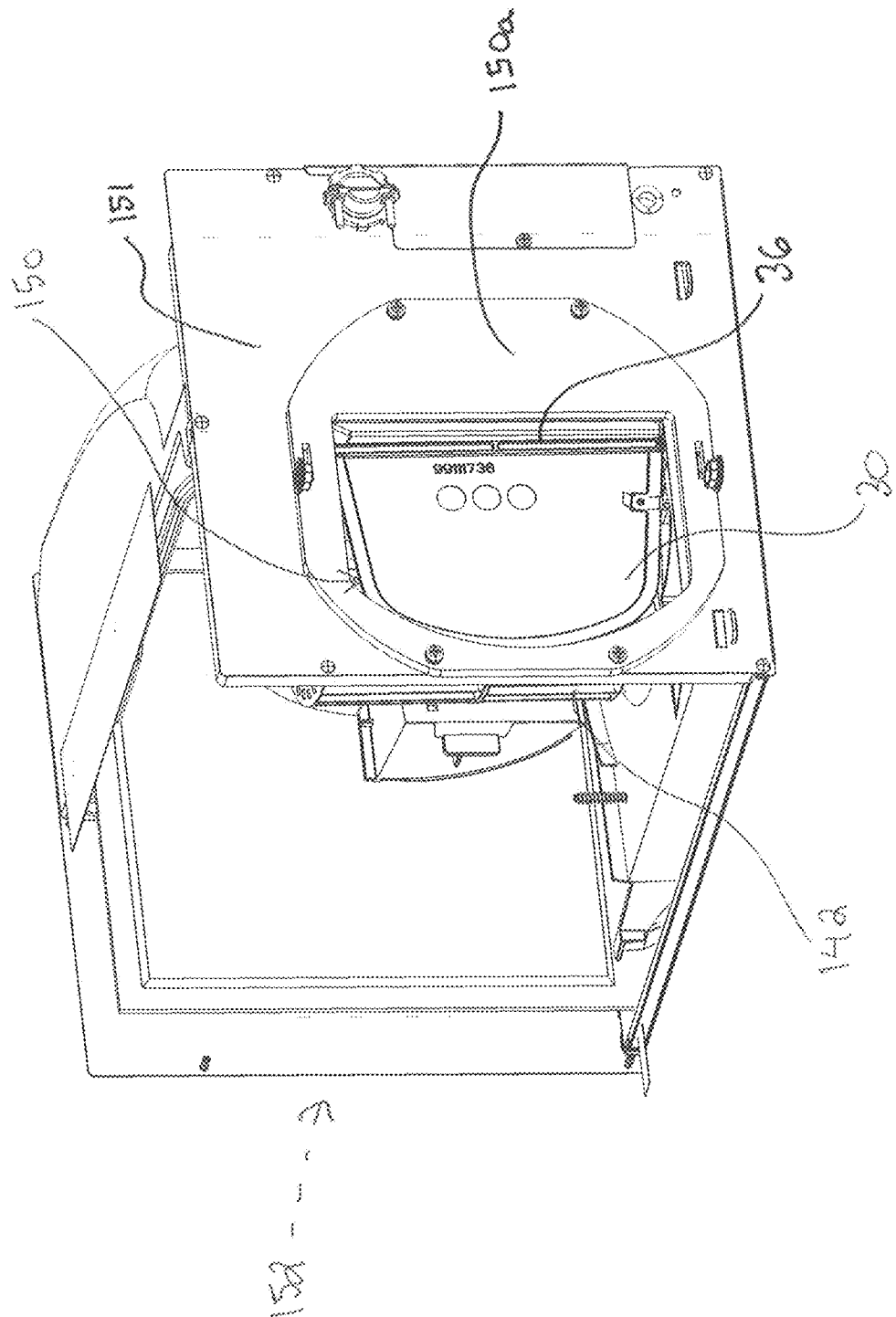
FIG. 11 is an isometric view of the damper body disposed within the supply fan of FIG. 10 as viewed from an airflow opening.

FIGS. 10 and 11 are illustrations of the supply fan unit 120 with the damper control assembly 20 incorporated therein in the closed position 168. The damper body 30 is disposed within the internal cavity 123 and a discharge opening 150 formed in an end wall 151 adjacent the discharge port 126. The fan 142 is disposed proximal the damper body 30 and between the discharge opening 150 and an inflow opening 152. In FIG. 11, the discharge port 126 is omitted to provide an unobstructed view of the damper body 30 within the discharge opening 150. In the closed position 168, the damper body 30 is substantially flush with a flange 150a of the discharge opening 150, although an appreciable gap is present therebetween (see FIG. 11).

Referring now to FIG. 12, the supply fan unit 120 of FIGS. 7, 10, and 11, with the damper control assembly 20 incorporated therein, is shown disposed within an HVAC system 154. The supply fan unit 120 has ducts 156, 158 coupled to the inflow port 124 and the outflow port 126, respectively.

In example embodiments, the in-line heater 162, sized according to airflow and outside design heating temperature from Manual J or ASHRAE specifications, may be installed to heat the air delivered to the AHU to an acceptable operating temperature. For example, it may be desirable to maintain a minimum temperature of 55° F. for all air passing through the AHU 160. The in-line heater 162 may have an integrated airflow sensor and a temperature sensor to prevent heating in no-flow or low-flow conditions, during which heating is typically not desirable.

In the open position 166, the damper body 30 is displaced outward by the motor 62 and the linkage assembly 88 relative to the end wall 151 wherein a distal portion or free end of the damper body 30 resides beyond the end wall 151 while the spine 36 remains substantially flush with the end wall 151. The heater 162 is coupled with an air inlet 164 through which fresh airflows to the heater 162. The air passes from the heater 162 through the duct 156 to the supply fan unit 120. Here, the supply fan unit 120 may operate to draw air through the inflow opening 152 when the damper body 30 is in the open position 166 (FIG. 2). However, when fresh air is not being taken in, the damper body 30 blocks the discharge opening 150.

In FIG. 13, the supply fan unit 120 is coupled by the duct 158 to the air handling unit 160. Accordingly, fresh air is drawn in by the fan 142, through the supply fan unit 120, and through the duct 158 to the AHU 160. From there, the AHU 160 may distribute the air through further ducting or operate in another suitable manner. The present disclosure contemplates the installation of the herein described damper control assembly within other ducting and/or other HVAC systems, including an AHU and/or one or more air outflow fan units.

Additional details concerning a supply fan unit are disclosed in co-owned and co-pending patent application Ser. No. 16/243,056, filed Jan. 8, 2019, entitled "SYSTEM AND METHOD FOR INTEGRATED CONTROL OF SUPPLY FAN". The entire disclosure thereof is hereby incorporated herein by reference.

INDUSTRIAL APPLICABILITY

According to an embodiment, the damper control system and/or assembly comprises a damper body for adjusting airflow by rotating about a first axis between a first threshold position and a second threshold position beyond which the damper body cannot be moved. Further the assembly includes a motor for driving the damper body and a controller for commanding the motor. The controller is adapted to detect a rotor-lock condition when the motor reaches the first threshold position and the second threshold position, to register a first hard limit value and a second hard limit value associated with the rotor-lock condition, to set an open position value and a closed position value in-between the range defined by the first and second threshold, and to command the motor to drive the damper body between the open position and the closed position.

The present damper control system/assembly provides advantages over the previous systems, including, for example: preventing mechanically, without the necessity of a position lock of the motor, the damper body to drive rotation of the motor, thereby decreasing wear on the motor; rendering the use of sensors in the ducting to detect limit/threshold positions of the damper body avoidable, thereby potentially decreasing the amount of electrical wiring; preventing premature wearing of the motor caused by rotor-lock detection following the driven component abutting an obstacle; and registering parameters representative of the normal course of the damper body between the threshold positions, thereby providing tools for improving driving of the damper body to a desired position and accordingly developing a finer adjustment of the airflow.

While preferred embodiments have been described above and illustrated in the accompanying drawings, it will be evident to those skilled in the art that modifications may be made without departing from this disclosure. Such modifications are considered as possible variants comprised in the scope of the disclosure.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

All numbers and ranges disclosed above may vary by some amount. Whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

In one aspect, a term coupled or the like may refer to being directly coupled. In another aspect, a term coupled or the like may refer to being indirectly coupled. Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The use of the terms "a" and "an" and "the" and "said" and similar references in the context of describing the invention (especially in the context of the following claims) are to be construed to cover both the singular and the plural, unless otherwise indicated herein or clearly contradicted by context. An element proceeded by "a," "an," "the," or "said" does not, without further constraints, preclude the existence of additional same elements. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Numerous modifications to the present disclosure will be apparent to those skilled in the art in view of the foregoing description. Preferred embodiments of this disclosure are described herein, including the best mode known to the inventors for carrying out the disclosure. It should be understood that the illustrated embodiments are exemplary only, and should not be taken as limiting the scope of the disclosure.

What is claimed is:

1. A damper control assembly for modifying an airflow path, the damper control assembly comprising:
   a damper body movable about an axis between a first threshold position and a second threshold position;
   a motor operably connected to the damper body, wherein the motor is configured to be driven by a phase current profile to drive the damper body between the first threshold position to determine an open position and the second threshold position to determine a closed position; and,
   a controller for operating the motor, the controller having a stall detection module that detects a first rotor-lock condition when the motor drives the damper body to the first threshold position and a second rotor-lock condition when the motor drives the damper body to the second threshold position, the controller further having a memory module for storing the first and second threshold positions for use by the controller during operation of the damper control assembly;
   wherein a calibration process detects the first rotor-lock condition by a change in phase current profile created by an absence of back EMF.

2. The damper control assembly of claim 1, wherein the calibration process customizes the damper control assembly for ducting having differing dimensions.

3. The damper control assembly of claim 2, wherein the memory module stores instructions for executing the calibration process.

4. The damper control assembly of claim 1, wherein the controller comprises a communication module for communicating with an air handling unit that resides downstream of the damper control assembly.

5. The damper control assembly of claim 4, wherein the controller operates the motor according to instructions received at the communication module from the air handling unit.

6. The damper control assembly of claim 1, wherein the motor is a stepper motor.

7. The damper control assembly of claim 6, wherein the controller determines a first gap amount between the first threshold position and the open position of the damper body.

8. The damper control assembly of claim 7, wherein the controller determines a second gap amount between the second threshold position and the closed position of the damper body.

9. The damper control assembly of claim 8, wherein an operating range of the damper body is defined between the open position and the closed position.

10. A supply fan assembly, comprising:
a housing defining an air inlet port and an air outlet port, the housing defining an internal cavity in fluid communication with both the air inlet port and the air outlet port;
a blower fan assembly disposed within the internal cavity of the housing;
a damper control assembly disposed within the internal cavity and between the outlet port and the blower fan assembly, the damper control assembly comprising:
a damper body movable about a first axis between a first threshold position and a second threshold position;
a motor operably connected to the damper body, wherein the motor is configured to be driven according to a phase current profile to drive the damper body between the first threshold position to determine an open position and the second threshold position to determine a closed position; and,
a controller for operating the motor, the controller having a stall detection module that detects a first rotor-lock condition when the motor drives the damper body to the first threshold position and a second rotor-lock condition when the motor drives the damper body to the second threshold position, the controller further having a memory module for storing the first and second threshold positions for use by the controller during operation of the damper control assembly;
wherein a calibration process detects the first rotor-lock condition by a change in the phase current profile created by an absence of back EMF.

11. The supply fan assembly of claim 10, wherein the calibration process customizes the supply fan assembly for ducting comprising differing dimensions.

12. The supply fan assembly of claim 11, wherein the memory module stores instructions for executing the calibration process.

13. The supply fan assembly of claim 10, wherein the controller comprises a communication module for communicating with an air handling unit that resides downstream of the supply fan assembly.

14. The supply fan assembly of claim 13, wherein the controller operates the motor according to instructions received at the communication module from the air handling unit.

15. The supply fan assembly of claim 10, wherein the motor is a stepper motor.

16. The supply fan assembly of claim 10, wherein the controller determines a first gap amount between the first threshold position and the open position of the damper body.

17. The supply fan assembly of claim 16, wherein the controller determines a second gap amount between the second threshold position and the closed position of the damper body.

18. The supply fan assembly of claim 17, wherein an operating range of the damper body is defined between the open position and the closed position.

19. A method of controlling an air supply fan, the method comprising the steps of:
providing a supply fan with a damper, a motor and a controller with a processor and a memory module;
arranging the motor to move the damper about an axis;
controlling operation of the motor and the damper with the controller;
driving the motor to move the damper toward an open position according to a phase current profile to drive the damper until a change in the phase current profile is detected due to an absence of Back ElectroMotive Force,
driving the motor to move the damper toward a closed position according to a phase current profile to drive the damper until the a change in the phase current profile is detected due to the absence of back EMF; and
storing the open and closed positions in the memory module for use by the controller in operation of the motor and damper.

20. The control method of claim 19, wherein first and second thresholds are defined by interaction between a linkage assembly and the motor.

21. The control method of claim 19, wherein first and second thresholds are defined by interaction between the damper and at least one side of ducting.

22. The control method of claim 19, further comprising calibrating the open position by driving the damper to a first threshold position.

23. The control method of claim 22, further comprising calibrating the closed position by driving the damper to a second threshold position.

24. The control method of claim 19, wherein a first nominal gap is approximately 4.5 degrees.

25. The control method of claim 24, wherein a second nominal gap is approximately 4.5 degrees.

26. The control method of claim 19, wherein a calibrating step comprises operating the motor until the damper makes physical contact with first and second thresholds.

* * * * *